Aug. 23, 1932.  C. A. GOOLEY ET AL  1,873,118
WINDSHIELD WIPER
Filed April 14, 1930
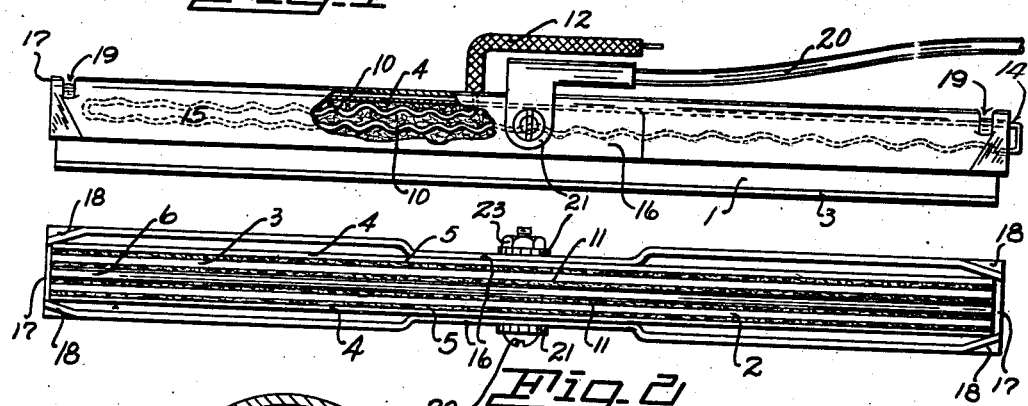
Fig. 1
Fig. 2
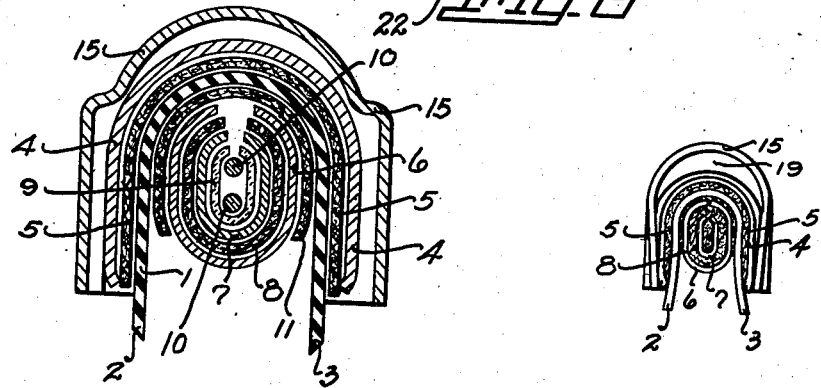
Fig. 3
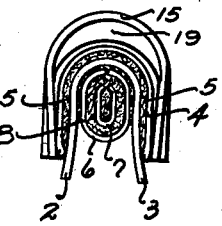
Fig. 4
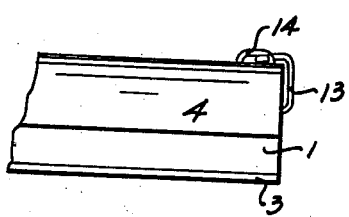
Fig. 5
CLARENCE A. GOOLEY
EDWARD L. GOOLEY JR.
Inventor
By Herbert E. Smith
Attorney Patented Aug. 23, 1932

1,873,118

UNITED STATES PATENT OFFICE

CLARENCE A. GOOLEY AND EDWARD L. GOOLEY, JR., OF HARRINGTON, WASHINGTON

WINDSHIELD WIPER

Application filed April 14, 1930. Serial No. 444,126.

Our present invention relates to an improved windshield wiper of the electrically heated type and designed to be swung or oscillated across a portion of the outer face of the windshield, either manually, or by the use of an electric motor or by the employment of the usual fluid pressure motor for this purpose.

In connection with the wiper we provide means whereby the heat from the heating element enclosed within the device, is retained for use, and distributed effectively and without unnecessary waste over the surface to be wiped. In carrying out our invention we utilize a rubber sheet, U-shaped in cross section, which sheet is retained within a holder, with its spaced working edges projecting from the holder, and forming between them a heat chamber. The heat in the chamber between the two wiping edges is thus carried back and forth across the face of the wiped windshield for the purpose of melting congealed moisture, and for drying the surface while it is being cleansed.

Our invention consists in certain novel combinations and arrangements of parts involving the construction of the holder, its outer casing, the heater, and the rubber wiper, as will hereinafter be more fully set forth and claimed. In the accompanying drawing we have illustrated one complete example of the physical embodiment of our invention wherein the parts are combined and arranged according to the best mode we have thus far devised for the practical application of the principles of our invention.

Figure 1 is a side view, partly broken away, of a windshield wiper embodying our invention.

Figure 2 is an edge view showing the working face of the device.

Figure 3 is an enlarged, transverse sectional view of the wiper, showing the parts thereof in open or spread position before they are clamped together.

Figure 4 is a sectional view of the device with the parts in working position.

Figure 5 is a view at one end of the device showing the ground for one of the electric wires, the outer casing of the device being omitted.

In carrying out our invention we utilize the usual sheet of rubber 1 that is fashioned in U-shape with its two free edges 2 and 3 adapted to wipe across the face of the windshield for performing the usual functions of the device, and the wiper sheet is retained in a metal holder 4 with a sheet of asbestos 5 between the holder and the wiper or rubber sheet.

Within the holder is retained the electric heating element that includes an outer metallic tube 6 and an inner metallic tube 7 between which is a filler 8 of asbestos, and within the inner metallic tube is the tubular wire holder 9, of mica, that encloses the electric resistance wires 10, 10.

The heating element, as seen in Figures 3 and 4, is preferably elliptical in cross section, and a filler 11, of asbestos, is clamped between the rubber wiper-sheet and the heating element. The sheets of asbestos are employed for the purpose of preventing radiation of heat from the heating element as well as for fillers or linings in the metal construction, and the mica tube is an insulator against short circuiting of the electric current that is passed through the core of the heating element for the generation of heat within the element.

As seen in Figures 3 and 4 the holder at its edges projects beyond the exposed face of the heater, while the working edges 2 and 3 of the wiper project beyond the edges of the holder to form a heating space or chamber therebetween, and the heat from the heating element is distributed through this space or chamber, directly to the face of the windshield. Thus the heat is conserved and is directed or distributed against the surface to be warmed or heated without waste, and for cooperation with the two wiping edges of the wiper in cleansing the windshield.

A lead wire is designated at 12 in Figure 1, and in Figure 5 a ground wire 13 at the end of the holder is brought out and attached at 14 to a loop that is struck up from the metal of the holder, the electric circuit being completed in usual manner and the electrical energy being supplied through the wire 12 from a suitable source for the heating element.

In Figure 1 the resistance wire 10, 10 is shown as extending from its connection with the feed wire 12, toward the left end of the device, and then the wire 10 is formed as a return loop and extends to the opposite or right end of the device where the wire is grounded as at 14 (Figure 5) to the holder 4. The heating or resistance wire is thus fashioned with the loop to insure the greatest capacity for heating at that part of the wiper requiring the greater heat, i. e., the outer end of the wiper, which swings through a greater area of space than the inner end of the wiper.

The heating element and its holder are enclosed within an outer metallic casing or guard 15, which, as seen in Figure 1 has its opposite walls inset at 16 to form clamp faces that frictionally engage the exterior faces of the U-shaped holder. Between the inset faces and the ends of the casing, the latter is formed as an insulating jacket for retaining heat within the holder, the casing being spaced from the holder as indicated in Figures 3 and 4 to form the jacket or insulating space.

The casing or jacket also is U-shaped in cross section, and its ends 17, 17 close the ends of the holder and heating element, a suitable opening being provided for the wire 13, and for the lead wire 12.

In addition to the frictional contact at the center of the device between the inset faces 16 and the holder, these members are in frictional contact at or near their ends, through use of the inwardly bent flanges 18 arranged in pairs at the opposite ends of the casing. These flanges close or seal the ends of the casing against loss of heat, as well as perform the function of fastening the casing on the holder at the ends of the latter.

In the rounded or back portion of the casing, and adjacent its ends are countersunk ribs 19 for the further sealing the ends of the insulating jacket, these ribs being in contact with the face of the rounded portion or back of the holder.

The arm 20 is a lever arm that suitably suspended to swing the wiper device across the face of a portion of the windshield, and this arm has a forked head 21 that is perforated for the attaching and pivot screw or bolt 22. The bolt passes through the holder and is fastened by means of a nut 23, and the wiper device and arm are so related that the wiper is held in operative position against the face of the windshield for the proper performance of its functions. The attaching device for the arm thus forms the clamp device for the central part of the holder and casing, and the several parts of the device are clamped together securely to prevent displacement.

Having thus fully described our invention, what we claim as new and desire to secure by Letters Patent is:—

The combination in a windshield wiper of an electric heating element and a U-shaped holder, of a rubber sheet retained between the heating element and the holder with its free edges projecting beyond the holder to form wipers, a metallic casing over the holder and spaced therefrom to form a heat insulating jacket, said casing having transversely extending indented ribs near its ends engaging the holder and closed ends over the holder, pairs of inset end flanges frictionally engaging the holder, an operating arm, and connecting means between the arm and the wiper.

In testimony whereof we affix our signatures.

CLARENCE A. GOOLEY.
EDWARD L. GOOLEY, Jr.